(12) United States Patent
Takita et al.

(10) Patent No.: US 11,156,244 B2
(45) Date of Patent: Oct. 26, 2021

(54) EMBOSSED COMPONENT AND HOUSING AND IMAGE FORMING APPARATUS INCLUDING SAME

(71) Applicants: Kohei Takita, Kanagawa (JP); Toshikazu Hirakawa, Kanagawa (JP); Eiri Sagae, Kanagawa (JP); Satoshi Kai, Kanagawa (JP); Taisuke Tokuwaki, Kanagawa (JP); Shumpei Takahashi, Kanagawa (JP); Riku Maeshiro, Kanagawa (JP); Shinichi Tanaka, Kanagawa (JP)

(72) Inventors: Kohei Takita, Kanagawa (JP); Toshikazu Hirakawa, Kanagawa (JP); Eiri Sagae, Kanagawa (JP); Satoshi Kai, Kanagawa (JP); Taisuke Tokuwaki, Kanagawa (JP); Shumpei Takahashi, Kanagawa (JP); Riku Maeshiro, Kanagawa (JP); Shinichi Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 16/262,173

(22) Filed: Jan. 30, 2019

(65) Prior Publication Data
US 2019/0285100 A1  Sep. 19, 2019

(30) Foreign Application Priority Data

Mar. 13, 2018 (JP) .............................. JP2018-045660

(51) Int. Cl.
*B21D 22/02* (2006.01)
*G03G 21/16* (2006.01)
(Continued)

(52) U.S. Cl.
CPC .............. *F16B 5/0621* (2013.01); *B21D 5/00* (2013.01); *B31F 1/07* (2013.01); *G03G 21/1619* (2013.01);
(Continued)

(58) Field of Classification Search
CPC .............. G03G 15/60; G03G 21/1619; G03G 21/1647; G03G 2221/1654;
(Continued)

(56) References Cited

U.S. PATENT DOCUMENTS 6,385,418 B1 * 5/2002 Fukuchi .............. G03G 15/757
399/167
2004/0244459 A1  12/2004 Shiokawa
(Continued)

FOREIGN PATENT DOCUMENTS

JP     6-238360       8/1994
JP     H09-295071 A  11/1997
(Continued)

OTHER PUBLICATIONS

Extended European Search Report dated Sep. 6, 2019, issued in corresponding European Application No. 19154862.7.

*Primary Examiner* — Sophia S Chen
(74) *Attorney, Agent, or Firm* — Harness Dickey & Pierce, P.L.C.

(57) ABSTRACT

An embossed component for positioning an article having a through hole includes a planar portion and an embossed portion projecting from a surface of the planar portion. The embossed portion is tapered toward a tip side and to be fitted into the through hole. The embossed portion includes a straight base end portion continuous with the planar portion and extending vertically with respect to the planar portion toward the tip side of the embossed portion, and an opening is at a tip of the embossed portion.

12 Claims, 6 Drawing Sheets (51) Int. Cl.
- *F16B 5/06* (2006.01)
- *B21D 5/00* (2006.01)
- *B31F 1/07* (2006.01)
- *B21D 28/26* (2006.01)
- *G03G 15/00* (2006.01)

(52) U.S. Cl.
CPC ......... *G03G 21/1647* (2013.01); *B21D 22/02* (2013.01); *B21D 28/26* (2013.01); *G03G 15/60* (2013.01); *G03G 2221/1654* (2013.01); *G03G 2221/1678* (2013.01)

(58) Field of Classification Search
CPC . G03G 2221/1678; F16B 5/0621; B21D 5/00; B21D 22/02; B21D 28/26; B31F 1/07
See application file for complete search history.

(56) References Cited

U.S. PATENT DOCUMENTS

| | | | |
|---|---|---|---|
| 2009/0142106 A1 | 6/2009 | Kondo et al. | |
| 2011/0016944 A1 | 1/2011 | Tamai | |
| 2011/0042545 A1 | 2/2011 | Fichter et al. | |
| 2015/0143676 A1 | 5/2015 | Kanayama et al. | |
| 2015/0336155 A1 | 11/2015 | Kawai et al. | |

FOREIGN PATENT DOCUMENTS

| | | |
|---|---|---|
| JP | 2000-042641 | 2/2000 |
| JP | 2013-244521 | 12/2013 |
| JP | 2014-062658 | 4/2014 |

\* cited by examiner

EMBOSSED COMPONENT AND HOUSING AND IMAGE FORMING APPARATUS INCLUDING SAME

CROSS-REFERENCE TO RELATED APPLICATION

This patent application is based on and claims priority pursuant to 35 U.S.C. § 119(a) to Japanese Patent Application No. 2018-045660, filed on Mar. 13, 2018, in the Japan Patent Office, the entire disclosure of which is hereby incorporated by reference herein.

BACKGROUND

Technical Field

The present disclosure relates to an embossed component, and a housing and an image forming apparatus including the embossed component.

Description of the Related Art

There are positioning structures employing an embossed portion. For example, in a through-hole in a sheet metal component, an embossed portion of a separate component is fitted, thereby coupling the two components.

SUMMARY

An embodiment of this disclosure provides an embossed component for positioning an article having a through hole. The embossed component includes a planar portion and an embossed portion projecting from a surface of the planar portion. The embossed portion is tapered toward a tip side and to be fitted into the through hole. The embossed portion includes a straight base end portion continuous with the planar portion and extending vertically with respect to the planar portion toward the tip side of the embossed portion, and an opening is at a tip of the embossed portion.

According to another embodiment, a housing includes the embossed component described above.

According to yet another embodiment, an image forming apparatus includes the embossed component described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

First, a conventional positioning structure is described with reference to FIGS. 13 and 14.

Figure 13:
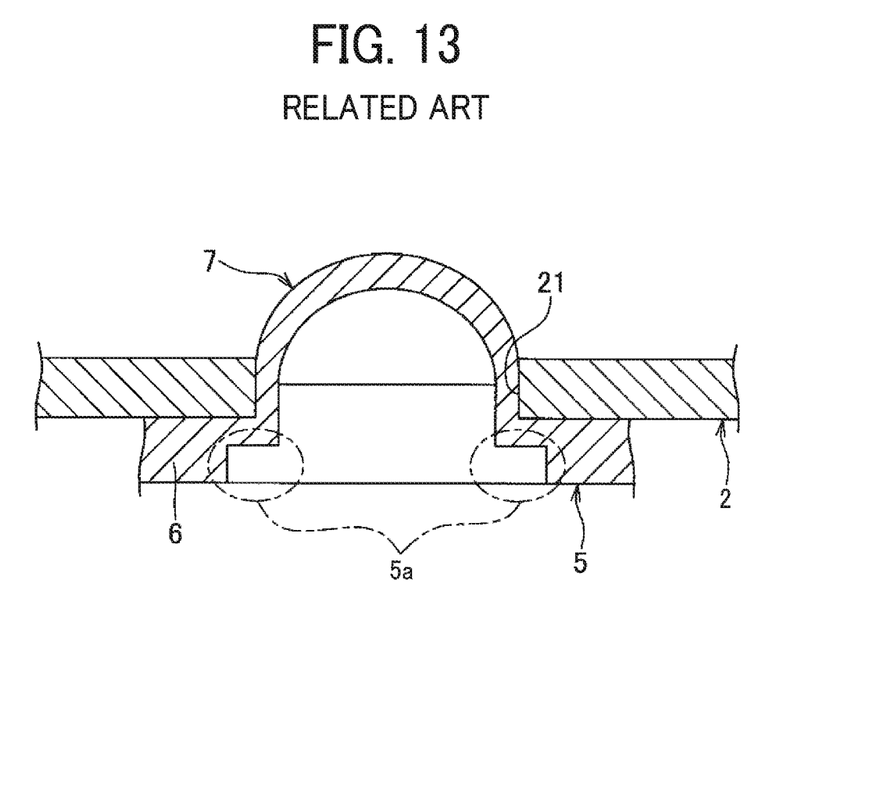
FIG. 13 is a cross-sectional view illustrating an article positioned with respect to a conventional embossed component, with an embossed portion of the embossed component fitted into a through hole of the article.

Referring to FIG. 13, an article 2 constructed of sheet metal having a through hole 21 is positioned using an embossed component 5 including an embossed portion 7 projecting from a surface of a planar portion 6 constructed of sheet metal. On a base end side, the embossed portion 7 includes a straight portion continuous with the planar portion 6 is cylindrical and extends vertically relative to the planar portion 6, toward the tip side, and the projecting end of the embossed portion 7 has a spherical (hemispherical) face. In this positioning structure, the embossed portion 7 is fitted into the through hole 21, thereby positioning the article 2 with respect to the embossed component 5.

In the conventional positioning structure illustrated in FIG. 13, the straight portion of the embossed portion 7 is made relatively long (high), to ensure reliable positioning of the article 2. Since the embossed component 5 is pressed to make the straight portion relatively long, a step 5a is created near the base end of the embossed portion 7. Thus, the conventional embossed component 5 includes the step 5a near the base end of the embossed portion 7, to secure the height of the straight portion.

In the conventional embossed component 5, as the step 5a is formed, a thin portion F (see FIG. 14) is formed near the base end of the embossed portion 7. The strength of the thin portion F is sufficient when sheet metal having a thickness equal to or greater than 1 mm is used. However, to reduce the cost, use of thinner sheet metal is preferred.

Referring now to the drawings, wherein like reference numerals designate identical or corresponding parts throughout the several views thereof, embossed components and an image forming apparatus according to embodiments of this disclosure are described. As used herein, the singular forms "a", "an", and "the" are intended to include the plural forms as well, unless the context clearly indicates otherwise.

Figure 1:
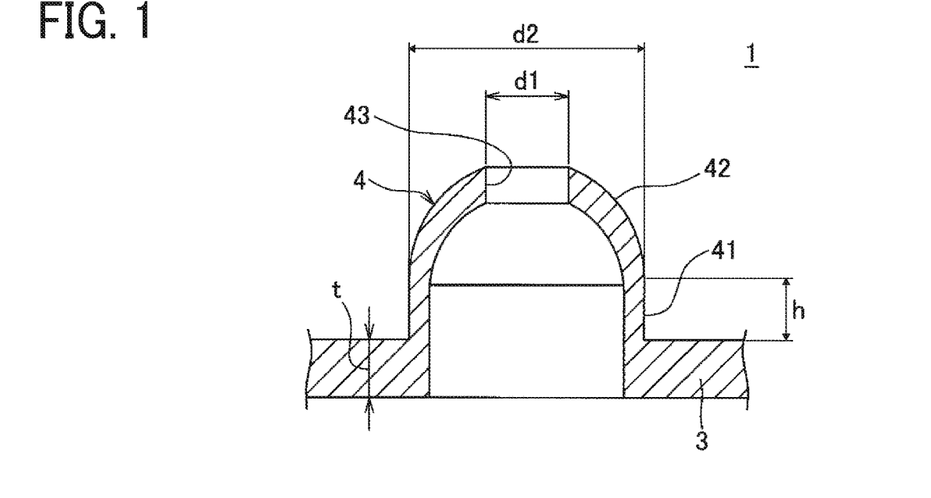
FIG. 1 is a cross-sectional view schematically illustrating a main portion of an embossed component according to an embodiment of the present disclosure.
Figure 2:
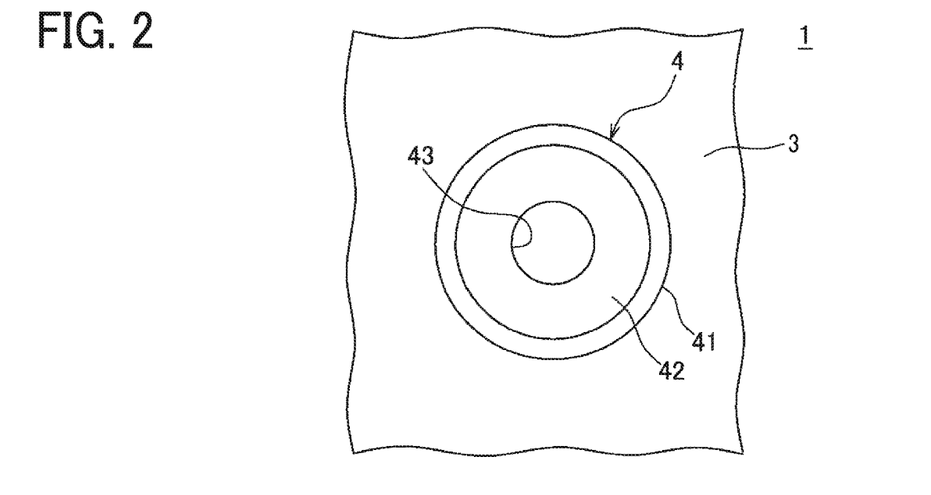
FIG. 2 is a plan view of the embossed component illustrated in FIG. 1.
Figure 3:
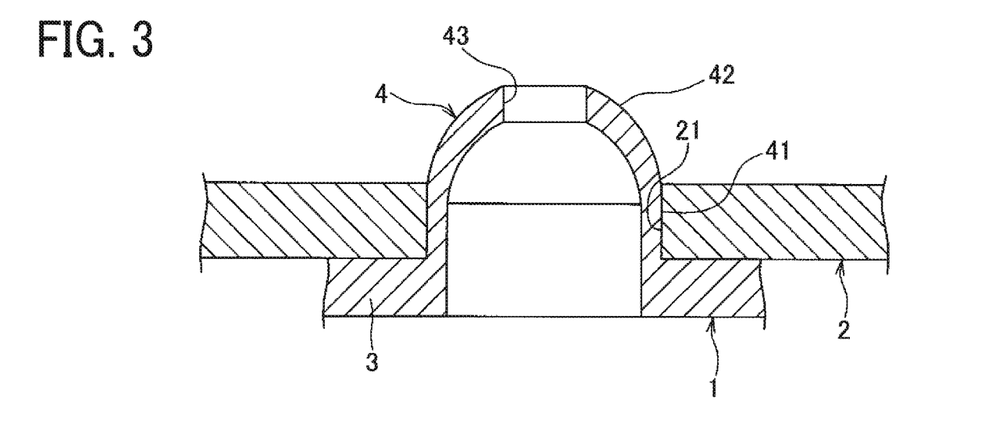
FIG. 3 is a cross-sectional view illustrating an article positioned with respect to the embossed component illustrated in FIG. 1, with an embossed portion of the embossed component fitted into a through hole of the article.

An embossed component according to one embodiment of the present disclosure will be described with reference to FIGS. 1 to 9. FIG. 1 is a cross-sectional view schematically illustrating a main portion of an embossed component 1 according to one embodiment of the present disclosure. FIG. 2 is a plan view of the embossed component 1 illustrated in FIG. 1. FIG. 3 is a cross-sectional view illustrating a state in which an embossed portion 4 of the embossed component 1 illustrated in FIG. 1 is fitted into a through hole 21 of an article 2 and the article 2 is positioned with respect to the embossed component 1.

The embossed component 1 illustrated in FIGS. 1 to 3 is constructed of a sheet metal member processed by pressing or the like. The embossed component 1 includes a planar portion 3 and an embossed portion 4 projecting from the surface of the planar portion 3. The embossed portion 4 is tapered toward the tip side thereof. As illustrated in FIG. 3, the position of the article 2 having the through hole 21 is determined with respect to the embossed component 1, as the embossed portion 4 is fitted into the through hole 21.

The shape of the embossed portion 4 will be described in further detail. The embossed portion 4 includes a straight portion 41 positioned on the base end side thereof, a tapered portion 42 located on the tip side thereof, and an opening 43 at the tip thereof.

The straight portion 41 is continuous with the planar portion 3 and cylindrical, extending vertically relative to the planar portion 3 toward the tip side of the embossed portion 4. An inner diameter and an outer diameter d2 (see FIG. 1) of the straight portion 41 are substantially constant in the entire range in the height direction. The straight portion 41 has a height h that is greater than a thickness t of the planar portion 3. In the present specification, the "height h of the straight portion" is defined as the length from the surface of the planar portion 3 to the base end of the tapered portion 42 (that is, from the surface of the planar portion 3 to the start point of the tapered shape of the embossed portion 4).

The straight portion 41 is a portion to be fitted into the through hole 21 of the article 2 and determines the position of the article 2. The article 2 is laid on or under the planar portion 3 with the surface thereof in contact with the planar portion 3. The inner surface of the through hole 21, which is circular in plan view, conforms to the outer surface of the straight portion 41.

In such a structure, since the height h of the straight portion 41 is greater than the thickness t of the planar portion 3, the article 2 is less likely to be come off from the embossed portion 4, and the article 2 is reliably positioned. In addition, although the article 2 is produced by pressing or the like of sheet metal in the description above, articles to which aspects of the present disclosure are applied are not limited thereto but can be made of synthetic resin, for example.

In the example illustrated in FIG. 3, the article 2 and the embossed component 1 are directly in contact with each other, but another member (for example, a member for height adjustment) can be interposed between the article 2 and the planar portion 3 of the embossed component 1.

The tapered portion 42 is continuous with the straight portion 41 and extends in a cylindrical shape. The tapered portion 42 is shaped such that the inner diameter and the outer diameter gradually decrease with increasing distance from the straight portion 41. The tapered portion 42 guides the embossed portion 4 of the embossed component 1 into the through hole 21 of the article 2.

The opening 43 is a portion enclosed by the edge of the tapered portion 42 and circular in plan view as illustrated in FIG. 2.

In addition, the embossed component 1 of the present embodiment is constructed of low carbon steel having a carbon content equal to or smaller than 0.25%. Examples of such steel includes SPCC, SPCD, SPCE, SPCG, SGCC, SGCE, and SGCD according to Japan Industrial Standard (JIS). Use of such a material facilitates pressing to be described later. However, the present disclosure can be embodied in other ways, and various types of metal can be used for the embossed component 1.

Figure 4:
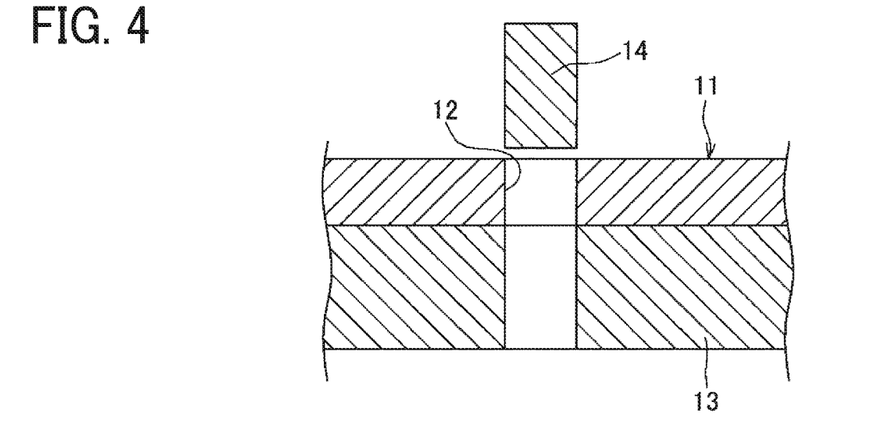
FIG. 4 is a cross-sectional view for explaining a method for forming the embossed component illustrated in FIG. 1, in which a perforation punch is pushed toward a sheet metal member placed on a perforation die, to form the through hole.
Figure 5:
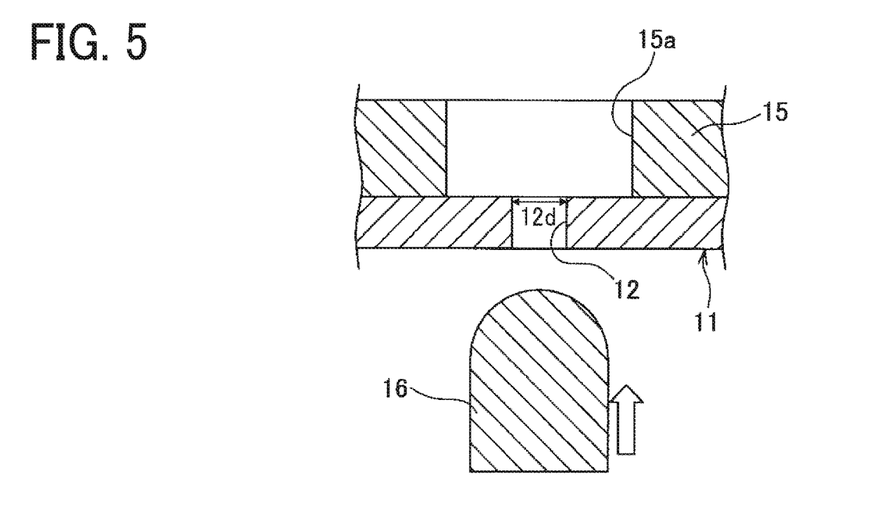
FIG. 5 is a cross-sectional view for explaining a method for forming the embossed component illustrated in FIG. 1, in which the sheet metal member having the through hole in FIG. 4 is placed on a molding die, and a molding punch is pushed toward the center of the through hole, to form the embossed portion.
Figure 6:
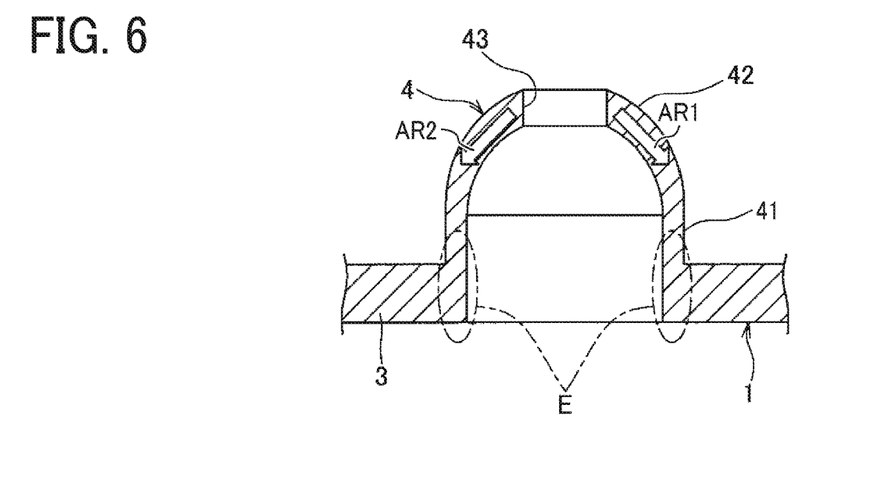
FIG. 6 is a cross-sectional view illustrating a flow of material during manufacturing of the embossed portion illustrated in FIG. 1.

A method for forming the embossed component 1 will be described. FIG. 4 is a cross-sectional view for explaining the method for forming the embossed component 1 illustrated in FIG. 1. In FIG. 4, a perforation punch 14 is pushed toward a sheet metal member 11 placed on a perforation die 13, to form a through hole 12. FIG. 5 is a cross-sectional view for explaining the method for forming the embossed component 1 illustrated in FIG. 1. In FIG. 5, the sheet metal member 11 having the through hole 12 in FIG. 4 is placed on a molding die 15, and a molding punch 16 is pushed to the center of the through hole 12 so as to form the embossed portion 4. FIG. 6 is a cross-sectional view illustrating the flow of material during manufacturing of the embossed portion 4 illustrated in FIG. 1.

The embossed component 1 illustrated in FIG. 1 is molded through primary pressing illustrated in FIG. 4 and secondary pressing illustrated in FIG. 5.

In the primary pressing illustrated in FIG. 4, the sheet metal member 11 is placed on the perforation die 13, and the perforation punch 14 is pushed toward the sheet metal member 11 to form the through hole 12 in the sheet metal member 11. The through hole 12 becomes the opening 43 after undergoing the secondary pressing. In the present embodiment, the through hole 12 is circular, and a diameter 12d of the through hole 12 is smaller than a diameter d1 (see FIG. 1) of the resultant opening 43. The diameter 12d of the through hole 12 is appropriately changed depending on the required height h and the strength of the straight portion 41 and the thickness of the sheet metal member 11.

In the secondary pressing illustrated in FIG. 5, the sheet metal member 11 in which the through hole 12 has been formed in the primary pressing is placed on the molding die 15, and the molding punch 16 is extruded toward the center of the through hole 12, to form the embossed portion 4. Further, the molding punch 16 used here is columnar and has a hemispherical tip. In addition, the molding die 15 has a hole 15a having a diameter substantially equal to the outer diameter d2 of the straight portion 41 of the resultant product. As the sheet metal member 11 and the molding punch 16 are pushed into the hole 15a, the embossed portion 4 illustrated in FIG. 1 is formed. The amount by which the molding punch 16 extruded is adjusted depending on the size of the embossed portion 4 and the thickness of the sheet metal member 11. When the value calculated by dividing the inner diameter d1 (see FIG. 1) of the opening 43 of the finished product with the diameter 12d (see FIG. 5) of the through hole 12 (d1/12d) is equal to or smaller than 4.0, breakage of the embossed portion 4 hardly occurs during the secondary pressing.

Figure 14:
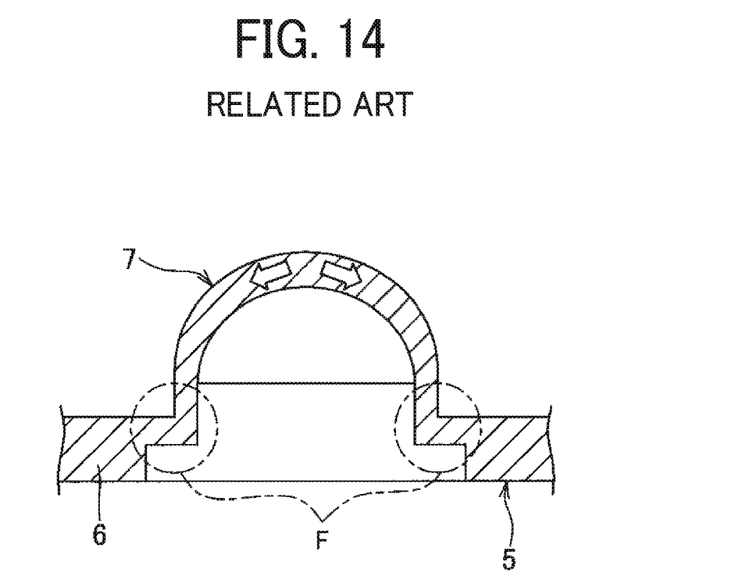
FIG. 14 is a cross-sectional view illustrating a flow of material during manufacturing of the embossed portion illustrated in FIG. 13.

FIG. 14 is a view illustrating the flow of material during press molding of the conventional embossed portion 7 illustrated in FIG. 13. During the press molding of the embossed portion 7, as the punch is pressed against the sheet metal, the material at the tip of the embossed portion 7 flows in the directions indicated by arrows. However, the tip of the embossed portion 7 is continues, and the material becomes taut and hardly flows to the base end side. Therefore, the thin portion F illustrated in FIG. 14 is formed near the base end of the embossed portion 7.

When the molding punch 16 is pressed against the sheet metal member 11 in the secondary pressing, the material on the tip side of the embossed portion 4 flows in the directions indicated by arrows AR1 and AR2 illustrated in FIG. 6. At that time, in the conventional embossed shape having no opening illustrated in FIG. 14, the material at the tip of the embossed portion becomes taut and is less likely to flow toward the base end side. By contrast, in the present embodiment, since the embossed portion 4 has the opening 43, the material on the tip side of the embossed portion 4 easily flows toward the base end side. That is, in the secondary pressing, the material on the tip side of the embossed portion 4 flows toward the base end side while the through hole 12 expands. Therefore, in the embossed component 1 according to the present embodiment, the height h of the straight portion 41 can be secured without forming a step (the step 5a in FIG. 13) near the base end of the embossed portion 4 as in the conventional structure. Therefore, even when the sheet metal member 11 smaller in thickness than that used in the conventional structure is used and the height h of the straight portion 41 is set high, a base end portion E (see FIG. 6) of the embossed portion 4 is not made too thin, and the strength of the embossed portion 4 can be secured.

The above-described structure of the embossed portion 4 is particularly effective when sheet metal having a smaller thickness (0.8 mm or less) than the conventional thickness is used. Even when the embossed portion 4 is constructed of sheet metal having the same thickness (about 1 mm) as the conventional thickness, the above-described structure is effective since both the height h of the straight portion 41 and the strength of the embossed portion 4 can be greater than those in the conventional structure. The conventional structure (see FIG. 13) having the step near the base end of the embossed portion is produced with sheet metal having a thickness equal to or greater than 1 mm. By contrast, the sheet metal usable for the embossed portion 4 according to the present embodiment can be selectable from a wider range of sheet metal ranging from thicker sheet metal to thinner sheet metal. Further, a common mold can be used for a wide range of sheet metal.

The inventors of the present disclosure have evaluated the strength and the guide function of the embossed portion 4, using a plurality of embossed components presented as Examples 1 to 9 in Table 1. Examples 1 to 9 are different in ratios of the inner diameter d1 of the opening 43 of the embossed portion 4 relative to the outer diameter d2 of the straight portion 41 (d1/d2) and the thickness of the sheet metal member 11 used for the embossed components. The results are presented in Table 1.

TABLE 1

| Example | d1/d2 | Sheet Metal Thickness (mm) | | |
|---|---|---|---|---|
| | | 1.0 | 0.8 | 0.6 |
| 1 | 0.2 | Poor | Poor | Poor |
| 2 | 0.3 | Good | Good | Good |
| 3 | 0.4 | Good | Good | Good |
| 4 | 0.5 | Good | Good | Good |
| 5 | 0.6 | Good | Good | Good |
| 6 | 0.7 | Good | Good | Good |
| 7 | 0.8 | Good | Good | Good |
| 8 | 0.9 | Good | Good | Good |
| 9 | 1.0 | Poor | Poor | Poor |

As presented in Table 1, in Example 1, the inner diameter d1 of the opening 43 divided by the outer diameter d2 of the straight portion 41 (d1/d2) is less than 0.3. The embossed portion 4 according to Example 1 was liable to be broken, failed to attain sufficient strength, and was evaluated as poor at all of thicknesses of 1.0 mm, 0.8 mm, and 0.6 mm. Further, in Example 9, the inner diameter d1 of the opening 43 divided by the outer diameter d2 of the straight portion 41 (d1/d2) is greater than 0.9. In Example 9, at all of thicknesses of 1.0 mm, 0.8 mm, and 0.6 mm, the area of the tapered portion 42 serving as the guide was smaller, making it difficult to fit the embossed portion 4 into the through hole 21 of the article 2. Thus, Example 9 was evaluated as poor. In Examples 2 to 8 in which the inner diameter d1 of the opening 43 divided by the outer diameter d2 of the straight portion 41 (d1/d2) is equal to or greater than 0.3 and equal to or smaller than 0.9, at all of thicknesses of 1.0 mm, 0.8 mm, and 0.6 mm, both the strength and the guide function of the embossed portion 4 were good. Thus, Examples 2 to 8 were evaluated as good.

Figure 8:
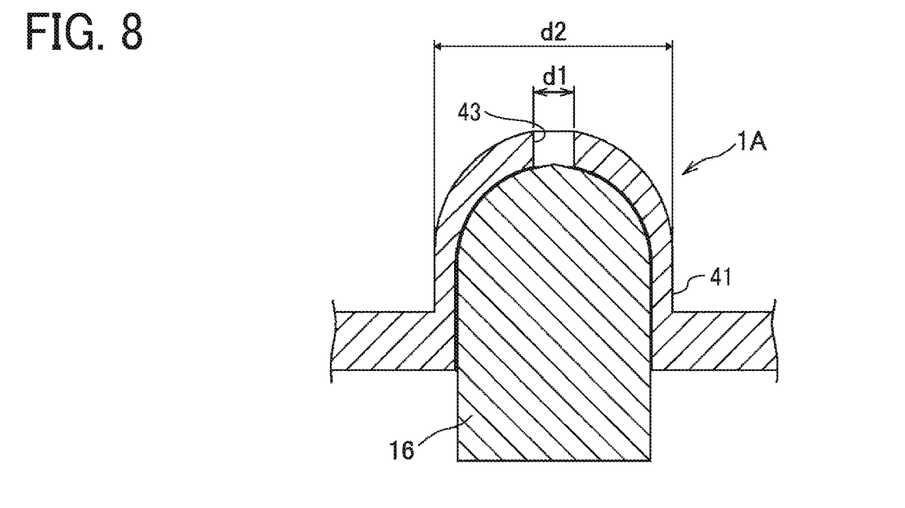
FIG. 8 is a view of an embossed component according to a comparative example, in which the ratio of the inner diameter of the opening of the embossed portion relative to the outer diameter of the straight portion is smaller than a predetermined range.

FIG. 8 is a view of an embossed component 1A in which the inner diameter d1 of the opening 43 divided by the outer diameter d2 of the straight portion 41 is less than 0.3, as a comparative example. Referring to FIG. 8, descriptions are given of a breaking mechanism that can occur in the embossed component 1A. As illustrated in FIG. 8, in a structure in which the ratio of the inner diameter d1 of the opening 43 relative to the outer diameter d2 of the straight portion 41 is smaller than the above range, the following inconvenience is possible. When the molding punch 16 is pressed against the sheet metal, the contact area between the front end portion of the molding punch 16 and the sheet metal is large, and the material on the tip side of the embossed portion 4 is less likely to flow to the base end side. Therefore, in the embossed component 1A, the vicinity of the base end of the embossed portion 4 is easily broken.

Figure 9:
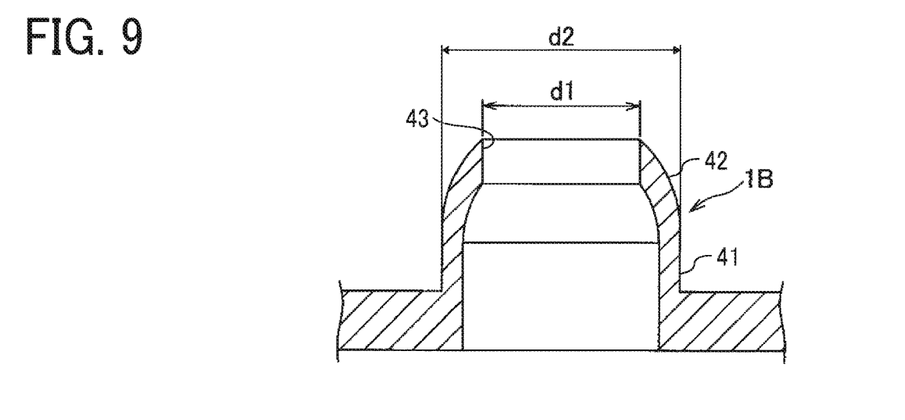
FIG. 9 is a view of an embossed component according to another comparative example, in which the ratio of the inner diameter of the opening of the embossed portion relative to the outer diameter of the straight portion is greater than the predetermined range.

FIG. 9 is a view of an embossed component 1B in which the inner diameter d1 of the opening 43 divided by the outer diameter d2 of the straight portion 41 is greater than 0.9, as another comparative example. Referring to FIG. 9, descriptions are given of action of the embossed component 1B. As illustrated in FIG. 9, in the structure in which the ratio of the inner diameter d1 of the opening 43 relative to the outer diameter d2 of the straight portion 41 is greater than the above range, as apparent from FIG. 9, the tapered portion 42 on the tip side of the embossed portion 4, that is, the guide portion, is small. As the guide portion becomes smaller, fitting the embossed portion 4 into the through hole 21 of the article 2 becomes difficult, and the positioning workability is degraded.

Figure 7:
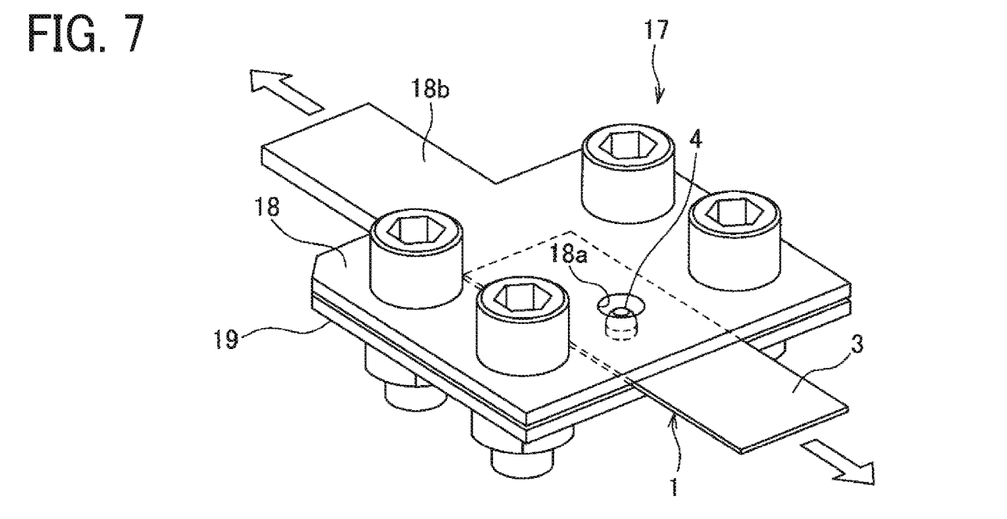
FIG. 7 is a view of an example jig for measuring the strength of an embossed component.

Furthermore, the inventors of the present application measured the strength of a conventional product and the embossed component 1 according to the present embodiment, using a jig 17 illustrated in FIG. 7. "Conventional product" mentioned here is the embossed portion 7 having the shape illustrated in FIG. 13 and constructed of sheet metal having a thickness of 0.8 mm. The jig 17 for strength testing illustrated in FIG. 7 includes an upper plate 18 and a lower plate 19 to sandwich the embossed component 1 and bolts for securing the upper plate 18 and the lower plate 19 to each other. The upper plate 18 includes a hole 18a for positioning the embossed portion 4 (or 7) and a projecting portion 18b. The embossed component 1 (or 5) was set on the jig 17, and one end of the embossed component 1 (the planar portion 3) and the projecting portion 18b were pulled in the directions indicated by arrows in FIG. 7. Thus, the strength of the conventional embossed component and that of the embossed component 1 according to the present embodiment were measured. The results are presented in Table 2.

In Table 2, "Embodiment" represents the embossed portion 4 having a shape illustrated in FIG. 1 and constructed of sheet metal having a thickness of 0.6 mm. Further, the inner diameter d1 of the opening 43 in the embossed portion 4 divided by the outer diameter d2 of the straight portion 41 is 0.7.

TABLE 2

|  | Strength |
|---|---|
| Conventional Product | 200N or below |
| Embodiment | About 900N |

As presented in Table 2, in the case of the conventional product, the strength is about 200 N or less including variations. With this strength, the embossed portion 7 may be broken due to assembling with the article 2, transportation, vibration, or the like. However, the strength of the product according to the present embodiment is high and about 900 N including variations. In addition, even in the product according to the present embodiment in which the inner diameter d1 of the opening 43 in the embossed portion 4 divided by the outer diameter d2 of the straight portion 41 is 0.3, the strength is higher than that of the conventional product.

Thus, in the embossed component 1, when the inner diameter d1 of the opening 43 divided by the outer diameter d2 of the straight portion 41 is equal to or greater than 0.3 and equal to or smaller than 0.9, the strength and the guide function of the embossed portion 4 are preferable.

Figure 10:
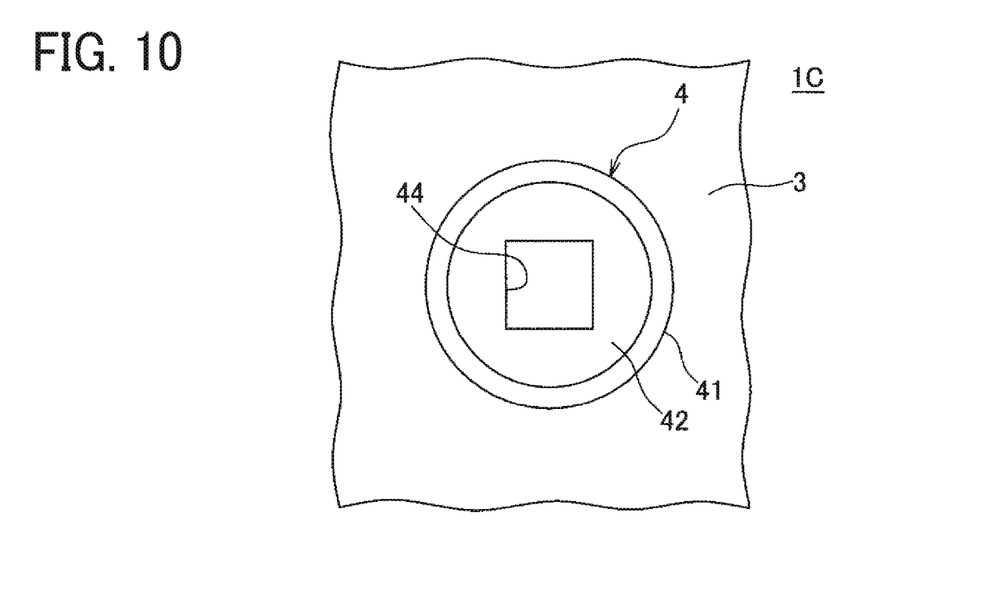
FIG. 10 is a plan view illustrating a variation of the embossed component illustrated in FIG. 1.

A variation of the above embodiment will be described with reference to FIG. 10. FIG. 10 is a plan view illustrating a variation of the embossed component illustrated in FIG. 1. In FIG. 10, the same components as those of the above embodiment (illustrated in FIGS. 1 to 9) are denoted by the same reference numerals, and descriptions thereof are omitted.

An embossed component 1C, illustrated in FIG. 10, according to the variation has an opening 44 that is tetragonal in plan view instead of the above-described opening 43. Thus, the shape of the opening (43 or 44 in the drawings) of the embossed portion 4 according to this disclosure is not limited to a circle (perfect circle) but can be a polygon such as a triangle, a quadrangle, or the like, or can be an ellipse. Further, according to the present disclosure, even an embossed portion having a polygonal or elliptical opening, the strength and the guide function of the embossed portion 4 are equivalent to those in the structure in which the opening is circular and superior to the strength and the guide function of the embossed portion 7 having the shape illustrated in FIG. 13 and constructed of sheet metal having a thickness of 0.8 mm.

In the above-described embodiment (FIGS. 1 to 9) and the variation (FIG. 10), the straight portion 41 have a cylindrical shape that is circular (perfect circle) in plan view, but the present disclosure can be embodied otherwise. The straight portion 41 can have a cylindrical shape that is elliptical in plan view. In the structure in which the outer shape of the straight portion 41 is elliptical or the shape of the opening (43 or 44 in the drawings) at the tip of the embossed portion 4 is polygonal or elliptical, the inner diameters and the outer diameters of such shapes are converted into circle-equivalent diameters. Then, the above-described ratio of the inner diameter d1 of the opening (43 or 44 in the drawings) relative to the outer diameter d2 of the straight portion 41 can be applied.

Figure 11:
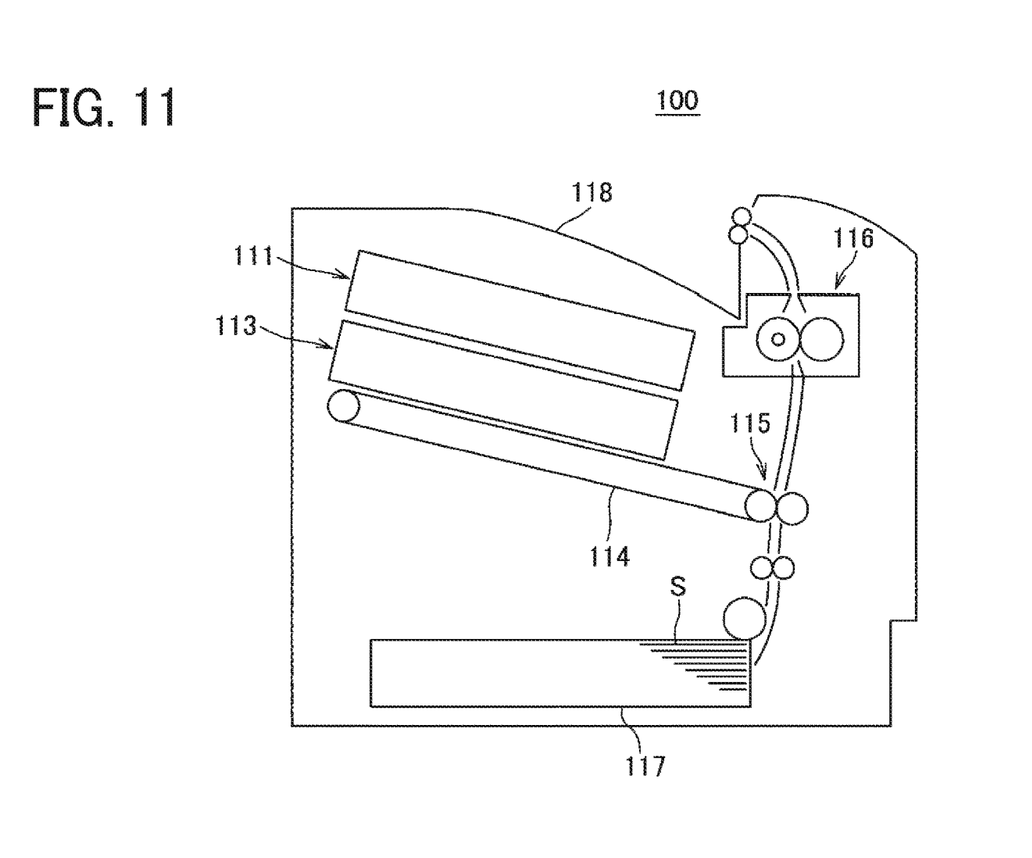
FIG. 11 is a schematic view of an image forming apparatus to which an embossed component according to an embodiment is applied.

Next, descriptions are given below of an image forming apparatus to which the embossed component 1 described above is applied, according to an embodiment, with reference to FIG. 11. An image forming apparatus 100 illustrated in FIG. 11 includes an optical scanner 111, an image forming unit 113 including a photoconductor and an intermediate transfer belt 114, a transfer device 115, a fixing device 116, a sheet feeding tray 117 to accommodate sheets S of various sizes, and an output tray 118.

In the image forming apparatus 100, the optical scanner 111 exposes the photoconductor to form an electrostatic latent image, the image forming unit 113 forms a toner image on the photoconductor, and the transfer device 115 transfers the toner image onto the sheet S fed from the sheet feeding tray 117. Then, the fixing device 116 fixes the toner image transferred on the sheet S. The sheet S on which the toner image is fixed is discharged to the output tray 118 outside the apparatus.

Figure 12:
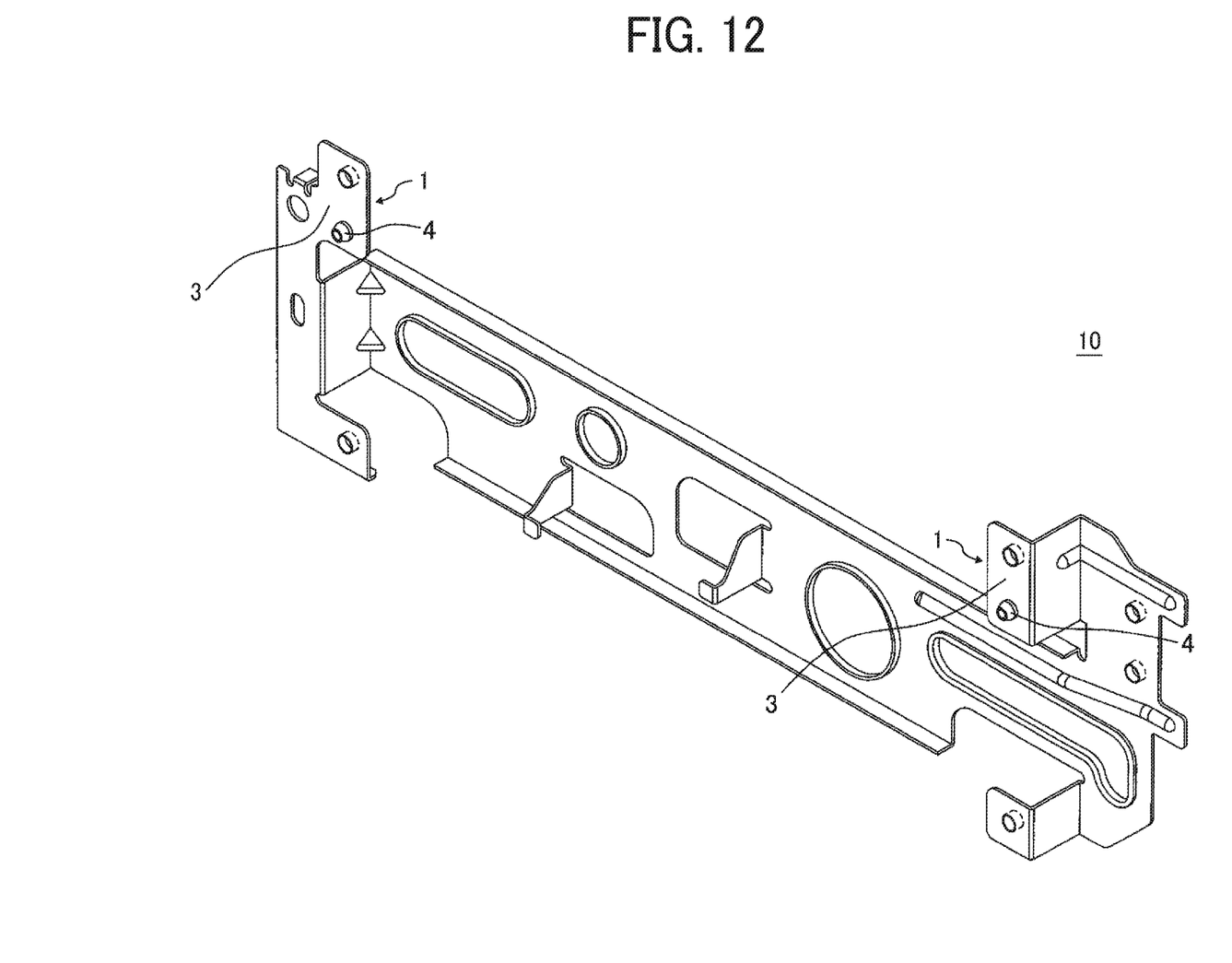
FIG. 12 is a perspective view of a bracket as an example of the embossed component used in the image forming apparatus illustrated in FIG. 11.

In the image forming apparatus 100, the embossed component 1 illustrated in FIG. 1 described above is used, for example, for a bracket 10 illustrated in FIG. 12. The bracket 10 is a part of the housing of the optical scanner 111 in the image forming apparatus 100 illustrated in FIG. 11. The bracket 10 is laid on or under another part (a sheet metal member, corresponding to the article 2 in FIG. 3), which is to be positioned relative to the housing. In the image forming apparatus 100, the bracket 10 can be constructed of sheet metal having a thickness (0.8 mm or less) smaller than the conventional thickness. Accordingly, the cost can be reduced, and the apparatus can be reduced in weight.

Although the description above concerns an example of applying the embossed component 1 to the housing of the image forming apparatus 100, embossed components according to aspects of the present disclosure are applicable to portions of the image forming apparatus 100 other than the housing and further to various apparatuses other than image forming apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An embossed component for positioning an article having a through hole, the embossed component comprising:
   a planar portion; and
   an embossed portion projecting from a surface of the planar portion such that the embossed portion is configured to fit into the through hole in the article, the embossed portion including:
      a straight base end portion extending perpendicular from the planar portion toward a tip side of the embossed portion; and
      a tapered portion curved inwards with an opening at a center thereof corresponding to a tip of the embossed portion.

2. The embossed component according to claim 1, wherein a height of the straight base end portion is greater than a thickness of the planar portion.

3. The embossed component according to claim 1, wherein an inner diameter of the opening divided by an outer diameter of the straight base end portion is equal to or greater than 0.3 and equal to or smaller than 0.9.

4. The embossed component according to claim 1, wherein the opening of the embossed portion has one of a circular shape and a polygonal shape.

5. A housing comprising the embossed component according to claim 1.

6. An image forming apparatus comprising the embossed component according to claim 1.

7. The embossed component according to claim 1, wherein the tapered portion curves inwards such that the embossed portion has a rounded nose with a hollow center.

8. The embossed component according to claim 1, wherein
   the planar portion extends in a length direction of the article such that the straight base end portion of the embossed portion is perpendicular to a surface of the article.

9. The embossed component according to claim 1, wherein
   the straight base end portion of the embossed portion is circular, and
   the through hole in the article has a circular shape with a diameter thereof corresponding to an outer diameter of the straight base end portion of the embossed portion such that the straight base end portion fits snug in the through hole in the article when the embossed portion penetrates the through hole.

10. The embossed component according to claim 1, further comprising:
   a sheet metal member including the planar portion and the embossed portion formed therefrom.

11. The embossed component according to claim 10, wherein the planer portion and the embossed portion are formed in the sheet metal member through an embossing process.

12. The embossed component according to claim 1, wherein the planer portion does not include a step at a junction where the planer portion meets the embossed portion.

* * * * *